United States Patent
Kashimura et al.

(10) Patent No.: US 12,424,688 B2
(45) Date of Patent: Sep. 23, 2025

(54) CYLINDRICAL BATTERY

(71) Applicants: SANYO Electric Co., Ltd., Daito (JP); Panasonic Corporation, Kadoma (JP)

(72) Inventors: Ryo Kashimura, Osaka (JP); Oose Okutani, Hyogo (JP); Shinya Geshi, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 817 days.

(21) Appl. No.: 17/415,270

(22) PCT Filed: Dec. 19, 2019

(86) PCT No.: PCT/JP2019/049756
§ 371 (c)(1),
(2) Date: Jun. 17, 2021

(87) PCT Pub. No.: WO2020/137778
PCT Pub. Date: Jul. 2, 2020

(65) Prior Publication Data
US 2022/0029232 A1 Jan. 27, 2022

(30) Foreign Application Priority Data
Dec. 28, 2018 (JP) .................................. 2018-246665

(51) Int. Cl.
*H01M 50/184* (2021.01)
*H01M 10/0587* (2010.01)
(Continued)

(52) U.S. Cl.
CPC ..... *H01M 50/184* (2021.01); *H01M 10/0587* (2013.01); *H01M 50/107* (2021.01); *H01M 50/543* (2021.01)

(58) Field of Classification Search
CPC ............ H01M 50/184; H01M 50/107; H01M 50/543; H01M 10/0587
(Continued)

(56) References Cited

U.S. PATENT DOCUMENTS

| | | |
|---|---|---|
| 2007/0275293 A1 | 11/2007 | Begg et al. |
| 2015/0364735 A1 | 12/2015 | Kohira et al. |
| 2017/0133645 A1 | 5/2017 | Miyata et al. |

FOREIGN PATENT DOCUMENTS

| | | |
|---|---|---|
| EP | 3905364 A1 | 11/2021 |
| JP | S61-157261 U | 9/1986 |

(Continued)

OTHER PUBLICATIONS

WO 2016157750 A1 (machine translation) (Year: 2016).*
(Continued)

*Primary Examiner* — Matthew T Martin
*Assistant Examiner* — Paul Christian St Wyrough
(74) *Attorney, Agent, or Firm* — WHDA, LLP

(57) ABSTRACT

A cylindrical battery wherein a central part of a sealing plate, fixed by swaging to an opening of an external packaging can, is configured to be warped toward the inner part of the battery. One embodiment is provided with: an electrode body in which a positive electrode plate and a negative electrode plate are rolled with a separator being disposed therebetween; an electrolytic solution; an external packaging can which has a bottomed cylindrical shape and which houses the electrode body and the electrolytic solution; and a sealing plate which is fixed by swaging to an opening of the external packaging can with a gasket therebetween. In the sealing plate, prior to the swage fixing, an outer peripheral edge to be fixed by swaging to the external packaging can is formed inclined so as to be directed to the inner part of the battery, toward radially outward.

1 Claim, 3 Drawing Sheets

(51) Int. Cl.
*H01M 50/107* (2021.01)
*H01M 50/543* (2021.01)

(58) Field of Classification Search
USPC .......................................... 429/185
See application file for complete search history.

(56) References Cited

FOREIGN PATENT DOCUMENTS

| JP | 11-260334 A | | 9/1999 | |
|----|----|----|----|----|
| JP | 2000113866 A | * | 4/2000 | |
| JP | 2009-123375 A | | 6/2009 | |
| JP | 2010503186 A | * | 1/2010 | |
| JP | 2016-177877 A | | 10/2016 | |
| WO | 2014/119308 A1 | | 8/2014 | |
| WO | 2015/146078 A1 | | 10/2015 | |
| WO | WO-2016157750 A1 | * | 10/2016 | ........ H01M 10/0422 |

OTHER PUBLICATIONS

JP-2010503186-A (machine translation) (Year: 2010).*
JP-2000113866-A (machine translation) (Year: 2000).*
International Search Report dated Mar. 10, 2020, issued in counterpart International Application No. PCT/JP2019/049756 (2 pages).
The Extended European Search Report dated Jan. 20, 2022, issued in counterpart EP Application No. 19901446.5. (7 pages).
Office Action dated Apr. 22, 2025, issued in counterpart EP Application No. 19901446.5. (6 pages).

* cited by examiner

CYLINDRICAL BATTERY

TECHNICAL FIELD

The present disclosure relates to a cylindrical battery.

BACKGROUND ART

For example, PATENT LITERATURE 1 discloses a cylindrical sealed battery. This cylindrical sealed battery comprises a bottomed cylindrical exterior can, a cylindrical winding electrode assembly and an electrolyte housed in the exterior can, and a sealing assembly that is caulked and fixed to an opening of the exterior can via an insulating gasket to seal the inside of the battery.

CITATION LIST

Patent Literature

PATENT LITERATURE 1: International Publication No. 2015/146078

SUMMARY

Technical Problem

In the cylindrical sealed battery described in the above PATENT LITERATURE 1, when the sealing assembly is caulked and fixed to the opening of the exterior can, a central portion of the sealing assembly is sometimes warped in a recessed shape on the lower side which is the battery inward side, or on the contrary, the central portion is sometimes warped in a projecting shape on the upper side, by the moment that acts on an outer circumferential end edge of the sealing assembly, or pressing force to the radially inner side. The case where the sealing assembly is warped on the lower side does not cause a problem. However, in a case where the central portion becomes the highest point in a state in which the battery is erected, due to the warping of the sealing assembly on the upper side, when a plurality of the cylindrical sealed batteries are assembled as a battery module, there is a risk that the sealing assembly interferes with the external lead for taking out an output current from the cylindrical sealed battery, and is damaged.

It is an advantage of the present disclosure to provide a cylindrical battery configured such that a central portion of a sealing plate caulked and fixed to an opening of an exterior can is reliably warped on the battery inward side.

Solution to Problem

A cylindrical battery of the present disclosure comprises: an electrode assembly in which a positive electrode plate and a negative electrode plate are wound via a separator; an electrolyte solution; a bottomed cylindrical exterior can that houses the electrode assembly and the electrolyte solution; and a sealing plate caulked and fixed to an opening of the exterior can via a gasket. The sealing plate has a circular shape in plan view, and an outer circumferential end edge of the sealing plate, the outer circumferential end edge being to be caulked and fixed to the exterior can, is formed in such a shape as to incline to a battery inward side toward a radially outer side, before caulking and fixing.

Advantageous Effect of Invention

According to the cylindrical battery according to the present disclosure, it is possible to reliably form a central portion of the sealing plate caulked and fixed to an opening of the exterior can in such a shape as to be warped on the battery inward side. Therefore, the sealing assembly can be prevented from interfering with an external lead for taking out an output current from the cylindrical battery, and being damaged, when a battery module is assembled.

DESCRIPTION OF EMBODIMENTS

Hereinafter, an embodiment according to the present disclosure will be described in detail with reference the attached drawings. In this description, specific shapes, materials, numerical values, directions, and the like are examples for facilitating understanding of the present disclosure, and can be appropriately changed in accordance with usage, a purpose, a specification, or the like. When a plurality of embodiments and modifications are included in the following, it is assumed from the beginning that those feature portions are appropriately combined to be used.

Figure 1:
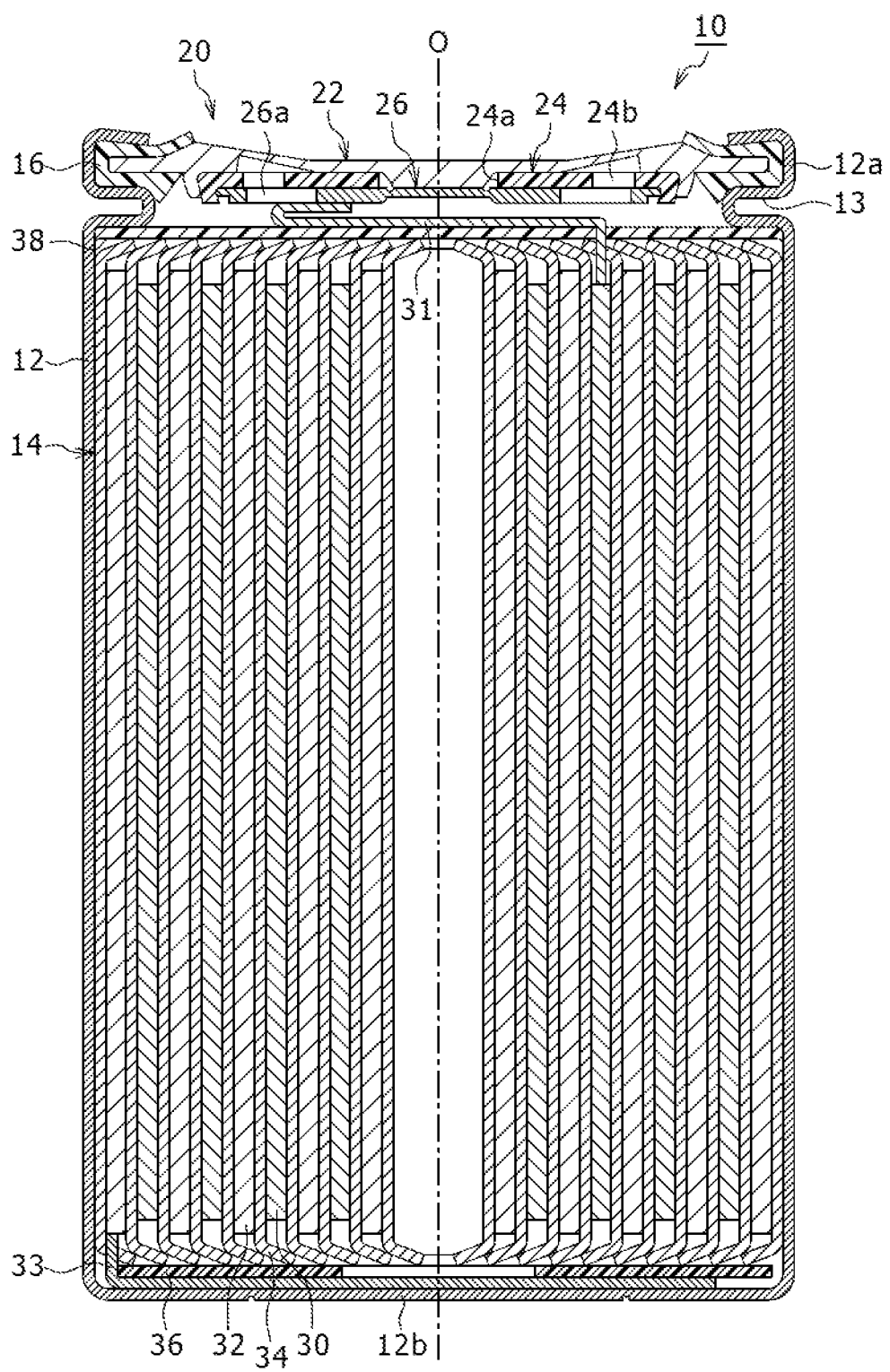
FIG. 1 is a sectional view in the axial direction of a cylindrical battery of an embodiment.
Figure 2:
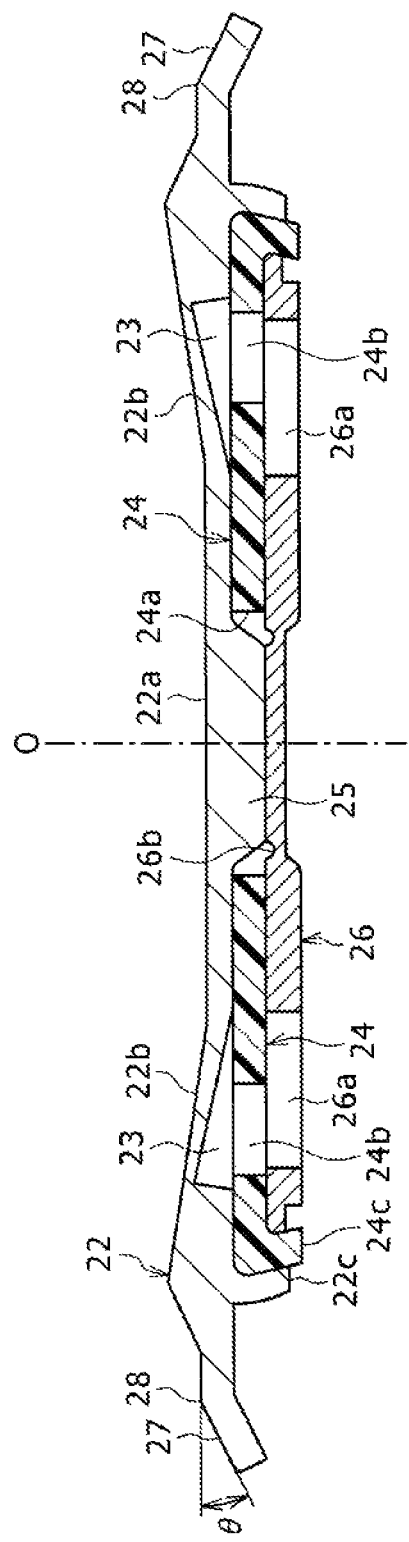
FIG. 2 is a sectional view of a sealing assembly.

FIG. 1 is a sectional view of a cylindrical battery 10 of an embodiment of the present disclosure. FIG. 2 is a sectional view of a sealing assembly 20. The cylindrical battery 10 is, for example, a non-aqueous electrolyte secondary battery. In FIG. 1 and FIG. 2, a centerline O in the axial direction is illustrated by a dashed line. In the following, in the cylindrical battery 10, the sealing assembly side is referred to as "up", and the bottom side of an exterior can is referred to as "bottom".

As illustrated in FIG. 1, the cylindrical battery 10 comprises a bottomed cylindrical exterior can 12, an electrode assembly 14 and an electrolyte solution (not illustrated) housed in the exterior can 12, and the sealing assembly 20 caulked and fixed to an opening of the exterior can 12 via a gasket 16 having an insulation property.

The exterior can 12 is formed by, for example, deep drawing a plate material made of steel material including iron as a main component. A grooved portion 13 is formed in an upper end portion 12*a* formed with the opening of the exterior can 12. The grooved portion 13 has an annular shape in plan view, and is formed so as to project, for example, in a substantially U-shape to the radially inner side of the exterior can 12. The grooved portion 13 is a portion where an outer circumferential end edge of the sealing assembly 20 is placed at the time of caulking and fixing to the exterior can 12.

A cylindrical electrode assembly 14 in which a positive electrode plate 30 and a negative electrode plate 32 are wound via a separator 34 is housed in the exterior can 12 together with an electrolyte. A lower insulating member 36 is interposed between the electrode assembly 14 and a bottom 12*b* of the exterior can 12, and a negative electrode lead 33 is connected to the negative electrode plate 32 composing the electrode assembly 14.

The lower insulating member 36 can ensure an insulation property, and can use a material that does not affect a battery characteristic. As the material used for the lower insulating member 36, polymer resin is preferable, and polypropylene (PP) resin and polybutylene terephthalate (PBT) resin are exemplified.

In this embodiment, the negative electrode lead 33 is connected to the negative electrode plate 32 at an outermost circumferential position of the electrode assembly 14. The negative electrode lead 33 extends from the electrode assembly 14 to be bent to the radially inner side, and is connected to the bottom 12b of the exterior can 12 on the lower side of the lower insulating member 36. Consequently, in the cylindrical battery 10 of this embodiment, the exterior can 12 functions as a negative electrode terminal. Details of the positive electrode plate 30, the negative electrode plate 32, and the separator 34 composing the electrode assembly 14 will be described later.

The electrode assembly 14 is housed on the lower side of the grooved portion 13 in the exterior can 12. An upper insulating member 38 is disposed on the electrode assembly 14, and an axially upper end surface of the electrode assembly 14 is not in contact with the sealing assembly 20 and the grooved portion 13 of the exterior can 12. The upper insulating member 38 can ensure an insulation property, and can use a material that does not affect a battery characteristic. As the material used for the upper insulating member 38, polymer resin is preferable, and polypropylene (PP) resin and polybutylene terephthalate (PBT) resin are exemplified.

The sealing assembly 20 is caulked and fixed to the upper end portion 12a of the exterior can 12 via the gasket 16. Consequently, the inside of the cylindrical battery 10 is sealed.

The sealing assembly 20 includes a sealing plate 22, an insulating plate 24, and a terminal plate 26. The sealing assembly 20 has a current breaking mechanism. The sealing plate 22 has a circular shape in plan view, and functions as a vent member. The insulating plate 24 is disposed in contact with a surface of the sealing plate 22 on the battery inward side.

The insulating plate 24 is formed in an annular shape in plan view, and has an opening 24a in a central portion.

The terminal plate 26 has a circular outer shape in plan view, and is disposed so as to face the sealing plate 22 with the insulating plate 24 interposed between the terminal plate 26 and the sealing plate 22. The center of the sealing plate 22 and the center of the terminal plate 26 are connected to each other through the opening 24a of the insulating plate 24, for example, by means of laser welding or the like. The other end of a positive electrode lead 31 having one end connected to the positive electrode plate 30 composing the electrode assembly 14 is connected to the terminal plate 26. The positive electrode lead 31 extends through the upper insulating member 38 from the electrode assembly 14, and is connected to the terminal plate 26 of the sealing assembly 20, for example, by means of laser welding or the like. Consequently, in the cylindrical battery 10 of this embodiment, the positive electrode plate 30 of the electrode assembly 14 is electrically connected to the sealing plate 22 through the positive electrode lead 31 and the terminal plate 26, and the sealing plate 22 exposed to the outside of the battery on an upper end surface of the cylindrical battery 10 functions as the positive electrode terminal.

The current breaking mechanism operates as follows. The terminal plate 26 is provided with a vent hole 26a, and the insulating plate 24 is provided with a vent hole 24b. Therefore, when battery internal pressure rises, the sealing plate 22 receives the pressure through the vent hole 26a of the terminal plate 26 and the vent hole 24b of the insulating plate 24. As a result, with the rise of the battery internal pressure, the sealing plate 22 acts so as to pull a connection portion with the terminal plate 26 to the outside of the battery. When the battery internal pressure reaches a predetermined value, the connection portion with the sealing plate 22 and the terminal plate 26 or a groove 26b provided in the terminal plate 26 breaks, a current path between the sealing plate 22 and the terminal plate 26 is interrupted. Thereafter, when the battery internal pressure further rises after the operation of the current breaking mechanism, an inclined region 22b that is a thin wall portion of the sealing plate 22, which will be described later, breaks, and gas inside the battery is exhausted. That is, the sealing plate 22 is opened at predetermined operating pressure, and functions as a vent member for releasing the battery internal pressure.

The sealing plate 22 can be produced by pressing a plate material of aluminum or an aluminum alloy. The aluminum and the aluminum alloy is excellent in flexibility, and therefore is preferably as a material of the sealing plate 22.

The sealing plate 22 has a circular shape in plan view. As illustrated in FIG. 2, in a central region 22a of the sealing plate 22, a surface on the battery outward side (or an upper surface) is formed in a flat surface. For example, a flat truncated cone-shaped projecting portion 25 is formed on a surface (or lower surface) on the battery inward side of the central region 22a of the sealing plate 22. The projecting height of the projecting portion 25 is set to be substantially the same as the plate thickness of the insulating plate 24. Such a projecting portion 25 is formed, so that it is possible to easily and reliably achieve the connection between the sealing plate 22 and the terminal plate 26, and secure a space for interposing the insulating plate 24 between the sealing plate 22 and the terminal plate 26.

The sealing plate 22 integrally has the inclined region 22b on the outer circumferential side of the central region 22a. In the inclined region 22b, the surface on the battery outward side is formed on an upwardly inclined surface toward the radially outer side. Consequently, the surface on the battery outward side of the sealing plate 22 has such a shape that the central region 22a is recessed on the battery inward side due to the presence of the inclined region 22b.

In the sealing plate 22, a space 23 having a substantially triangular cross-section is formed on the battery inward side of the inclined region 22b. Consequently, the inclined region 22b has a thin wall portion, the plate thickness of which gradually reduces toward the radially outer side. The inclined region is thus formed as the thin wall portion, so that when the battery internal pressure rises and the pressure acts on the inclined region 22b of the sealing plate 22 from the battery inward side, the inclined region 22b is set such that the thinnest portion (that is, a position corresponding to the apex of the triangular space 23) of the inclined region 22b breaks.

In this embodiment, an example in which the inclined region 22b is formed as the thin wall portion in which the plate thickness of the sealing plate 22 gradually reduces toward the radially outer side is described. However, the present disclosure is not limited to this, the inclined region 22b may be formed as the thin wall portion in which the plate thickness of the sealing plate 22 gradually increases toward the radially outer side.

On a surface of the sealing plate 22 on the battery inward side, a projection 22c having an annular shape in plan view is formed. The projection 22c is located on the radially outer side of the inclined region 22b on the surface on the battery outward side. The projection 22c is formed such that a tip is inclined to the radially inner side, and the insulating plate 24 is fitted and held inside the projection 22c.

Before caulking and fixing, an outer circumferential end edge 27 of the sealing plate 22, which is to be caulked and fixed to the exterior can 12, is formed in such a shape as to incline to the battery inward side toward the radially outer side. In other words, the outer circumferential end edge 27 of the sealing plate 22 is bent such that the outer circumferential side is inclined downward from a starting point position 28.

The inclination angle θ of the outer circumferential end edge 27 with respect to the radial direction of the sealing plate 22 can be set to be, for example, greater than 0 degrees and 30 degrees or below. The above angle range is set such that the amount of downward warpage of the sealing assembly 20 at the time of caulking and fixing is an appropriate amount.

The insulating plate 24 can ensure an insulation property, and can use a material that does not affect a battery characteristic. As the material used for the insulating plate 24, polymer resin is preferable, and polypropylene (PP) resin and polybutylene terephthalate (PBT) resin are exemplified.

The insulating plate 24 has a skirt portion 24c extending to the battery inward side in an outer circumferential portion of the insulating plate 24. The terminal plate 26 is fitted and held in an inner circumferential portion of the skirt portion 24c. Consequently, an outer circumferential end edge of the terminal plate 26 is assembled in a state of being engaged with the skirt portion 24c, and it is possible to reliably prevent the positional shift of the terminal plate 26 with respect to the insulating plate 24.

The terminal plate 26 has a circular shape with a diameter smaller than that of the insulating plate 24 in plan view, and the central portion is formed in the thin wall portion. The terminal plate 26 is preferably formed of aluminum or an aluminum alloy like the sealing plate 22. Consequently, the connection between the central portion of the sealing plate 22 and the central portion of the terminal plate 26 can be facilitated. As the connecting method, metallurgical joint is preferably used, and laser welding is exemplified as the metallurgical joint. The vent hole 26a is formed so as to penetrate in an outer circumferential portion of the terminal plate 26.

The sealing assembly 20 is assembled as follows. First, the sealing plate 22, the insulating plate 24, and the terminal plate 26 that composes the sealing assembly 20 are prepared. Next, the terminal plate 26 is fitted inside the skirt portion 24c of the insulating plate 24, then the insulating plate 24 is fitted inside the projection 22c of the sealing plate 22. The sequence of the two procedures of fitting the above members may be exchanged.

The connection between the sealing plate 22 and the terminal plate 26 is preferably performed after the above procedures are completed. The sealing plate 22 and the terminal plate 26 can be connected in a state of being positioned and held with each other, and therefore the variation in the connection strength is reduced.

Now, the electrode assembly 14 will be described. In this embodiment, as illustrated in FIG. 1, the electrode assembly 14 in which the positive electrode plate 30 and the negative electrode plate 32 are wound via the separator 34 to form a cylindrical shape is used.

The positive electrode plate 30 can be produced as follows, for example. First, a positive electrode mixture slurry is produced by kneading a positive electrode active material and a binder such that the positive electrode active material and the binder are uniform in a dispersion medium. Polyvinylidene fluoride is preferably used as the binder, and N-methylpyrolidone is preferably used as the dispersion medium. A conductive agent such as graphite and carbon black is preferably added to the positive electrode mixture slurry. This positive electrode mixture slurry is applied and dried on a positive electrode current collector to form a positive electrode mixture layer. At this time, the positive electrode current collector exposed portion where the positive electrode mixture layer is not formed is provided in a part of the positive electrode current collector. Next, the positive electrode mixture layer is compressed to a predetermined thickness by a roller, and a compressed pole plate is cut in a predetermined size. Finally, the positive electrode lead 31 is connected to the positive electrode current collector exposed portion to obtain the positive electrode plate 30.

As the positive electrode active material, a lithium transition metal composite oxide capable of occluding and releasing lithium ions can be used. Examples of the lithium transition metal composite oxide includes general formulas $LiMO_2$ (M is at least one of Co, Ni, and Mn), $LiMn_2O_4$ and $LiFePO_4$. One of these can be used singly, or two or more of these can be mixed to be used, and can be also used by adding at least one selecting the group consisting of Al, Ti, Mg, and Zr, or by being replaced with a transition metal element.

The negative electrode plate 32 can be produced as follows, for example. First, a negative electrode mixture slurry is produced by kneading a negative electrode active material and a binder such that the negative electrode active material and the binder are uniform in a dispersion medium. A styrene-butadiene (SBR) copolymer is preferably used as the binder, and water is preferably used as the dispersion medium. A thickener such as carboxymethyl cellulose is preferably added to the negative electrode mixture slurry. This negative electrode mixture slurry is applied and dried on the negative electrode current collector to form a negative electrode mixture layer. At this time, a negative electrode current collector exposed portion where the negative electrode mixture layer is not formed is provided in a part of the negative electrode current collector. Next, the negative electrode mixture layer is compressed to a predetermined thickness by a roller, and a compressed pole plate is cut in a predetermined size. Finally, the negative electrode lead 33 is connected to the negative electrode current collector exposed portion to obtain the negative electrode plate 32.

As the negative electrode active material, a carbon material or a metal material capable of occluding and releasing lithium ions can be used. Examples of the carbon material include graphite such as natural graphite and artificial graphite. Examples of the metal material include silicon and tin, and oxides of these. One of the carbon material and the metal material can be used singly, or two or more of the carbon material and the metal material can be mixed to be used.

As the separator 34, a microporous membrane containing polyolefin such as polyethylene (PE) and polypropylene (PP) as a main component can be used. One microporous membrane can be used singly, or two or more microporous membranes can be layered to be used. In the two or more layered separator, a layer containing polyethylene (PE) having a low melting point as a main component is preferably used as an intermediate layer, and polypropylene (PP) having excellent oxidation resistance is preferably used as a surface layer. Furthermore, inorganic particles such as aluminum oxide ($Al_2O_3$), titanium oxide ($TiO_2$) and silicon oxide ($SiO_2$) can be add to the separator 34. Such inorganic particles can be carried on the separator, and can be applied to a separator surface together with the binder.

As a non-aqueous electrolyte solution, a solution obtained by dissolving a lithium salt as an electrolyte salt in a non-aqueous solvent can be used.

As the non-aqueous solvent, cyclic carbonic acid ester, chain carbonic acid ester, cyclic carboxylic acid ester, and chain carboxylic acid ester can be used, and two or more of these are preferably mixed to be used. Examples of cyclic carbonic acid ester include ethylene carbonate (EC), propylene carbonate (PC), and butylene carbonate (BC). Like fluoroethylene carbonate (FEC), cyclic carbonic acid ester obtained by replacing a part of hydrogen with fluorine can be used. Examples of chain carbonic acid ester include dimethyl carbonate (DMC), ethylmethyl carbonate (EMC), diethyl carbonate (DEC), and methylpropyl carbonate (MPC). Examples of cyclic carboxylic acid ester include γ-butyrolactone (γ-BL) and γ-valerolactone (γ-VL), and examples of chain carboxylic acid ester include methyl pivalate, ethyl pivalate, methylisobutyrate and methyl propionate.

Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Among these, $LiPF_6$ is particularly preferable, and the concentration in the non-aqueous electrolyte solution is preferably 0.5 to 2.0 mol/L. Other lithium salt such as $LiBF_4$ can be mixed in $LiPF_6$.

Figure 3A:
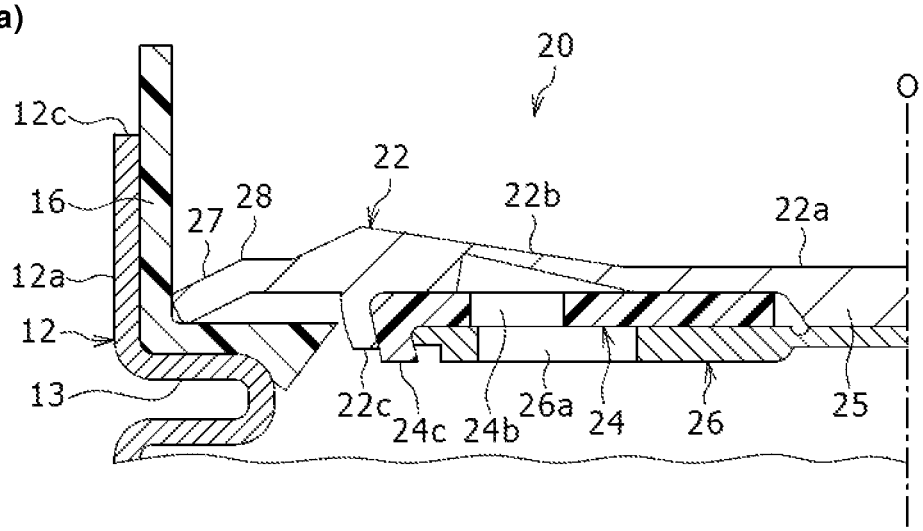
FIG. 3(*a*) is a sectional view of a radial half illustrating a sealing assembly and a vicinity thereof before caulking and fixing, and FIG. 3(*b*) is a sectional view of a radial half illustrating the sealing assembly and the vicinity thereof at the time of caulking and fixing.
Figure 3B:
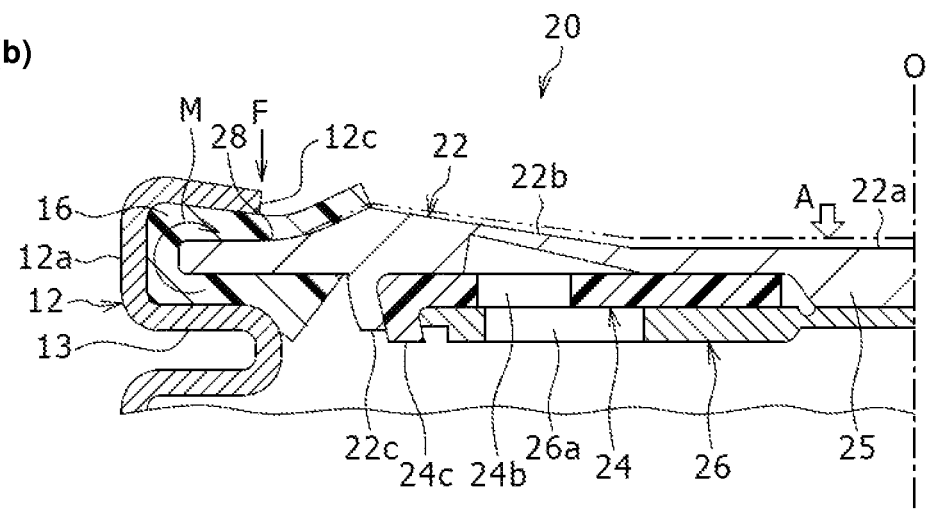

Now, caulking and fixing of the sealing assembly 20 will be described with reference to FIG. 3. FIG. 3(a) is a sectional view of a radial half illustrating the sealing assembly 20 and a vicinity thereof before caulking and fixing, and FIG. 3(b) is a sectional view of a radial half illustrating the sealing assembly 20 and a vicinity thereof at the time of caulking and fixing. In FIGS. 3(a) and 3(b), illustration of the positive electrode lead 31, the electrode assembly 14, and the like is omitted.

When the sealing assembly 20 is caulked and fixed to the exterior can 12, the outer circumferential end edge 27 of the sealing plate 22 is placed on the grooved portion 13 of the exterior can 12 via the gasket 16, as illustrated in FIG. 3(a). In this state, as illustrated in FIG. 3(b), the upper end portion 12a of the exterior can 12 is pressed and bent to the radially inner side by using a die (not illustrated), and the sealing assembly 20 is caulked and fixed.

At this time, pressing force F which becomes the largest at a position corresponding to a circumferential edge 12c of the opening of the exterior can 12 acts on an outer circumferential end edge 27 of the sealing plate 22. Consequently, the outer circumferential end edge 27 of the sealing plate 22, which is formed so as to incline before caulking and fixing, deforms in the direction along the radial direction of the sealing plate 22. At this time, moment M illustrated by an arc-shaped arrow acts on an outer circumferential portion including the outer circumferential end edge 27 of the sealing plate 22. As a result, the central region 22a of the sealing plate 22 is reliably assembled in such a shape as to warp in a recessed shape on the lower side (arrow A direction).

At this time, the starting point position 28 of the inclined outer circumferential end edge 27 of the sealing plate 22 is preferably located on the radially inner side with respect to the circumferential edge 12c of the opening of the exterior can 12 when the sealing plate 22 is caulked and fixed to the exterior can 12. With such positional relation, downward pressing force acts on the starting point position 28 of the outer circumferential end edge 27 at the time of caulking and fixing. As a result, stress that causes formation of the downward warped shape of the central portion of the sealing plate 22 and the sealing assembly 20 including the sealing plate 22 acts on the sealing plate 22.

When the caulking and the fixing are completed, and the cylindrical battery 10 is taken out of the die, the sealing plate 22 and the sealing assembly 20 including the sealing plate 22 are sprung back up to a position illustrated by a two-dot chain line in FIG. 3(b). The inclination angle θ of the outer circumferential end edge 27 of the sealing plate 22, the radial width of the outer circumferential end edge 27, and the like only need to be set such that this returning position becomes a desired position.

As described above, according to the cylindrical battery 10 of this embodiment, the outer circumferential end edge 27 of the sealing plate 22, the outer circumferential end edge 27 being caulked and fixed to the exterior can 12, is formed in such a shape as to incline to the battery inward side toward the radially outer side before caulking and fixing. Consequently, at the time of caulking and fixing to the exterior can 12, the sealing plate 22 and the sealing assembly 20 including the sealing plate 22 can be reliably assembled in such a shape as to warp to the lower side. Therefore, when a cylindrical battery in which the sealing assembly 20 is assembled in such a shape as to warp to the upper side is assembled as a battery module, the sealing assembly 20 can be prevented from interfering with an external lead for taking out an output current from the cylindrical battery 10, and being damaged.

In this embodiment, the sealing plate 22 has such a shape that the central region 22a is recessed to the battery inward side, and therefore when the sealing assembly 20 is caulked and fixed, the sealing plate 22 can be more reliably assembled in such a shape as to warp to the lower side.

The cylindrical battery according to the present disclosure is not limited to the above embodiment and modification, and various improvements and changes are possible within the matters described in the claims of the present application.

REFERENCE SIGNS LIST 10 cylindrical battery, 12 exterior can, 12a upper end portion, 12b bottom, 12c circumferential edge, 13 grooved portion, 14 electrode assembly, 16 gasket, 20 sealing assembly, 22 sealing plate, 22a central region, 22b inclined region, 22c projection, 23 space, 24 insulating plate, 24a opening, 24b, 26a vent hole, 24c skirt portion, 25 projecting portion, 26 terminal plate, 26b groove, 27 outer circumferential end edge, 28 starting point position, 30 positive electrode plate, 31 positive electrode lead, 32 negative electrode plate, 33 negative electrode lead, 34 separator, 36 lower insulating member, 38 upper insulating member, F pressing force, M moment, O centerline, θ inclination angle.

The invention claimed is:

1. A method of manufacturing a cylindrical battery, the cylindrical battery comprising: an electrode assembly in which a positive electrode plate and a negative electrode plate are wound via a separator; an electrolyte solution; a bottomed cylindrical exterior can that houses the electrode assembly and electrolyte solution; and a sealing plate caulked and fixed to an opening of the exterior can via a gasket, wherein the sealing plate has a circular shape in plan view, and an outer circumferential end edge of the sealing plate, the outer circumferential end edge being bent when caulked and fixed to the exterior can, such that the outer circumferential end edge is inclined downward from a starting point position, and wherein an uppermost portion of the sealing plate aligns in a height direction of the exterior can with a circumferential edge of the opening of the exterior can, and wherein the starting point position of the inclined outer circumferential end edge of the sealing plate is located on a radially inner side with respect to the opening circumferential edge of the exterior can at a time of caulking and fixing to the exterior can, and a downward pressing force acts on the starting point position at the time of caulking and fixing, the downward pressing force resulting in stress that causes formation of a downward warped shape of a central portion of the sealing plate.

* * * * *